United States Patent
Maekawa

(10) Patent No.: US 7,671,142 B2
(45) Date of Patent: Mar. 2, 2010

(54) THERMOPLASTIC RESIN HAVING RIGIDITY WHEN HEATED

(75) Inventor: Tomofumi Maekawa, Kawasaki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 715 days.

(21) Appl. No.: 10/582,556

(22) PCT Filed: Dec. 9, 2004

(86) PCT No.: PCT/JP2004/018388

§ 371 (c)(1),
(2), (4) Date: Jun. 9, 2006

(87) PCT Pub. No.: WO2005/056677

PCT Pub. Date: Jun. 23, 2005

(65) Prior Publication Data

US 2007/0142571 A1      Jun. 21, 2007

(30) Foreign Application Priority Data

Dec. 10, 2003   (JP)   ............................. 2003-412119

(51) Int. Cl.
C08L 69/00 (2006.01)
C08L 67/02 (2006.01)
(52) U.S. Cl. ..................... 525/439; 525/444
(58) Field of Classification Search .................. None
See application file for complete search history.

(56) References Cited

U.S. PATENT DOCUMENTS

| 4,948,871 | A |   | 8/1990 | Fukuoka et al. |
| 5,204,377 | A |   | 4/1993 | Fukuoka et al. |
| 5,340,909 | A |   | 8/1994 | Doerr et al. |
| 6,060,538 | A | * | 5/2000 | Gallucci ............... 523/217 |

FOREIGN PATENT DOCUMENTS

| JP | 51-140992 |   | 12/1976 |
| JP | 1-158033 |   | 6/1989 |
| JP | 1-271426 |   | 10/1989 |
| JP | 3-68627 |   | 3/1991 |
| JP | 5-262862 |   | 10/1993 |
| JP | 8-311177 |   | 11/1996 |
| JP | 2002-265771 |   | 9/2002 |
| JP | 2002-275369 |   | 9/2002 |
| JP | 2003020388 | * | 1/2003 |
| JP | 2003020398 | * | 1/2003 |
| JP | 2003-119363 |   | 4/2003 |
| JP | 2003-119365 |   | 4/2003 |
| WO | 2005/040278 |   | 5/2005 |

OTHER PUBLICATIONS

Tadmor, "Principles of Polymer Processing", 1979; p. 438.*
Tadmor, "Principles of Polymer Processing"; 1979, pp. 434-437.*
English language Abstract of JP 2003-119365.
English language Abstract of JP 2003-119363.
English language Abstract of JP 2002-265771.
English language Abstract of JP 2002-275369.
English language Abstract of JP 1-271426.
U.S. Appl. No. 10/576,259 to Kakegawa filed Apr. 18, 2006 and entitled "Polytrimethylene Terephthalate Reinforced Resin Composition".
English language Abstract of JP 51-140992.
English language Abstract of JP 8-311177.
English language Abstract of JP 5-262862.

* cited by examiner

*Primary Examiner*—David Buttner
(74) *Attorney, Agent, or Firm*—Greenblum & Bernstein, P.L.C.

(57) ABSTRACT

A thermoplastic resin composition which comprises (A) 1 to 99 parts by weight of polytrimethylene terephthalate and (B) 99 to 1 part by weight of a polycarbonate, wherein the ingredient (A) crystallization enthalpy, $\Delta Hcc$, which is obtained when the thermoplastic resin composition is heated from 0° C. at a rate of 20° C./min is 0 to 15 J/g.

10 Claims, No Drawings

THERMOPLASTIC RESIN HAVING RIGIDITY WHEN HEATED

TECHNICAL FIELD

The present invention relates to a novel thermoplastic resin composition. In particular, the present invention relates to a thermoplastic resin composition which possesses not only noticeably superior mechanical properties and moldability, but also excellent appearance, impact resistance, heat resistance and high-temperature rigidity. For example, the thermoplastic resin composition of the present invention can be suitably used for molding automobile parts materials, electric/electronic materials, industrial materials, engineering materials, and household appliances.

BACKGROUND ART

Resin compositions, which generally comprise an aromatic polyester and a polycarbonate, are widely used in the industry. Among them, resin compositions comprising a polytrimethylene terephthalate and a polycarbonate have excellent appearance, mechanical properties, heat resistance and dimension properties. Therefore, they are useful as a material in automobile parts, electric/electronic parts, construction parts and industrial parts. In particular, such resin compositions are useful as exterior automobile parts due to their excellent appearance and heat resistance. However, in recent years, heat resistance has become increasingly demanded in this industrial field. In this context, a conventional resin composition comprising a polytrimethylene terephthalate and a polycarbonate provides products with only insufficient high-temperature mechanical properties in the field where such high-temperature mechanical properties are required, e.g., automobile exterior handles or roof legs.

For example, Patent Document 1 discloses a thermoplastic resin composition comprising a polytrimethylene terephthalate and a polycarbonate having melt viscosity stability defined for the purpose of improving wet heat resistance. However, the demanded heat resistance and rigidity when heated are still not satisfied even if this technique is employed. In addition, Patent Document 2 discloses a resin composition comprising a polytrimethylene terephthalate and a polycarbonate, which is characterized in that the polytrimethylene terephthalate contains a specific amount of a dipropylene glycol component to improve wet heat resistance. However, heat resistance and physical properties when heated are still not improved even if this technique is employed.

Patent Document 1: JP-A-2002-265771
Patent Document 2: JP-A-2002-275369

DISCLOSURE OF THE INVENTION

An object of the present invention is to provide a thermoplastic resin composition which possesses not only noticeably superior mechanical properties and moldability, but also excellent appearance, impact resistance, heat resistance and rigidity when heated, for example, a thermoplastic resin composition which can be suitably used for molding automobile parts materials, electric/electronic materials, industrial materials, engineering materials, and household appliances.

As a result of extensive studies to solve the above-described problems, the present inventors have found that if the crystallization enthalpy $\Delta Hcc$, when heating a resin composition and resin molded article, each of which comprises (A) a polytrimethylene terephthalate and (B) a polycarbonate, is in a specific range, such molded article possesses excellent appearance, mechanical properties, impact resistance, and moldability, as well as excellent heat resistance and rigidity when heated. Moreover, the present inventors have found that unexpectedly advantageous effects in connection with heat resistance can be exhibited if the crystallization temperature when cooling is in a specific range. Based on these findings, they have completed the present invention.

That is, the attributes of the present invention are as follows.

1. A thermoplastic resin composition which comprises (A) 1 to 99 parts by weight of a polytrimethylene terephthalate and (B) 99 to 1 parts by weight of a polycarbonate, wherein a crystallization enthalpy $\Delta Hcc$ of component (A), which is obtained when the thermoplastic resin composition is heated from 0° C. at 20° C./min, is 0 to 15 J/g, the crystallization enthalpy $\Delta Hcc$ being calculated according to the following formula (I):

$$\text{Crystallization peak area } \Delta H \text{ measured using a } DSC \text{ (J/g)/the content of component } (A) \text{ based on the total amount of the thermoplastic resin composition (wt \%)} \times 100 = \Delta Hcc \text{ (J/g)} \quad (I).$$

2. The thermoplastic resin composition according to the above item 1, wherein a crystallization temperature Tc of the thermoplastic resin composition, which is obtained when the thermoplastic resin composition in a molten state at 270° C. is cooled at −20° C./min, is 145° C. or more.

3. The thermoplastic resin composition according to the above item 1, wherein a crystallization temperature Tc of the thermoplastic resin composition, which is obtained when the thermoplastic resin composition in a molten state at 270° C. is cooled at −20° C./min, is 175° C. or more.

4. The thermoplastic resin composition according to any one of the above items 1 to 3, wherein the thermoplastic resin composition comprises 1 to 50 parts by weight of component (A) and 99 to 50 parts by weight of component (B).

5. The thermoplastic resin composition according to any one of the above items 1 to 4, wherein the thermoplastic resin composition is produced by melt-kneading 2 to 99 parts by weight of a resin composition (D), which comprises 50 to 99 parts by weight of component (A) and 50 to 1 parts by weight of component (B), and 98 to 1 parts by weight of component (B), provided that component (D)+component (B)=100 parts by weight.

6. The thermoplastic resin composition according to any one of the above items 1 to 4, wherein the thermoplastic resin composition further comprises 0.1 to 100 parts by weight of a polyalkylene terephthalate resin (C) based on 100 parts by weight of the component (B), said polyalkylene terephthalate resin excluding polytrimethylene terephthalate, and wherein components (A) and (C) have a crystallization enthalpy $\Delta Hcc$ determined according to, instead of the formula (I), the following formula (II):

$$\text{Crystallization peak area } \Delta H \text{ measured using a } DSC \text{ (J/g)/(Sum of the content of component } (A) \text{ (wt \%) and the content of component } (C) \text{ (wt \%) based on the total amount of the thermoplastic resin composition)} \times 100 = \Delta Hcc \text{ (J/g)} \quad (II).$$

7. The thermoplastic resin composition according to the above item 6, wherein component (C) is a polyethylene terephthalate resin and/or a polybutylene terephthalate resin.

8. A resin molded article which is produced by molding the thermoplastic resin composition according to any one of the above items 1 to 7.

9. The resin molded article according to the above item 8, wherein a crystallization enthalpy ΔHcc of component (A) or components (A) and (C), which is obtained when the resin molded article is heated from 0° C. at 20° C./min, is 0 to 15 J/g, the crystallization enthalpy ΔHcc being calculated according to the following formula (III) or (IV):

Crystallization peak area ΔH measured using a DSC (J/g)/the content of component (A) (wt %) based on the total amount of the resin molded article (wt %)×100=ΔHcc (J/g)         (III), or Crystallization peak area ΔH measured using a DSC (J/g)/(Sum of the content of component (A) (wt %) and the content of component (C) (wt %) based on the total amount of the resin molded article)×100=ΔHcc (J/g)         (IV).

10. The resin molded article according to the above item 9, wherein a crystallization temperature Tc of the resin molded article, which is obtained when resin molded article in a molten state at 270° C. is cooled at −20° C./min, is 145° C. or more.

11. The resin molded article according to the above item 9, wherein a crystallization temperature Tc of the resin molded article, which is obtained when the resin molded article in a molten state at 270° C. is cooled at −20° C./min, is 175° C. or more.

12. A method for producing the thermoplastic resin composition according to any one of the above items 1 to 7, wherein said method comprises melt-kneading 2 to 99 parts by weight of a resin composition (D), which comprises 50 to 99 parts by weight of component (A) and 50 to 1 parts by weight of component (B), and 98 to 1 parts by weight of component (B), provided that component (D)+component (B)=100 parts by weight.

13. A method for molding the resin molded article according to any one of the above items 8 to 11, wherein said method comprises dry blending 2 to 99 parts by weight of a resin composition (D), which comprises 50 to 99 parts by weight of component (A) and 50 to 1 parts by weight of component (B), and 98 to 1 parts by weight of component (B), provided that component (D)+component (B)=100 parts by weight), and subsequently molding and shaping the dry-blended product.

The thermoplastic resin composition of the present invention not only has noticeably excellent mechanical properties and moldability as compared with a conventional thermoplastic resin composition, but also exhibits unexpectedly advantageous effects of excellent appearance, impact resistance, heat resistance and rigidity when heated.

BEST MODE FOR CARRYING OUT THE INVENTION

The polytrimethylene terephthalate (hereinafter sometimes abbreviated as "PTT") (A) in the invention is a polyester polymer using terephthalic acid as an acid component and trimethylene glycol as a glycol component. The trimethylene glycol in the invention can be selected from 1,3-propanediol, 1,2-propanediol, 1,1-propanediol, 2,2-propanediol and a mixture thereof. Among them, 1,3-propanediol is particularly preferable in view of stability.

Further, so long as the effects of the invention are not impaired, copolymerization can be carried out partly with an aromatic dicarboxylic acid other than terephthalic acid as an acid component, such as phthalic acid, isophthalic acid, 2,6-naphthalene-dicarboxylic acid, diphenyldicarboxylic acid, diphenylether-dicarboxylic acid, diphenoxyethane-dicarboxylic acid, diphenylmethane-dicarboxylic acid, diphenylketone-dicarboxylic acid, or diphenylsulfone-dicarboxylic acid, an aliphatic dicarboxylic acid such as succinic acid, adipic acid, or sebacic acid; an alicyclic dicarboxylic acid such as cyclohexane-dicarboxylic acid; or an oxydicarboxylic acid such as ε-oxycapronic acid, hydroxybenzoic acid, or hydroxyethoxybenzoic acid. Further, copolymerization can be carried out partly using a glycol component such as ethylene glycol, tetramethylene glycol, pentamethylene glycol, hexamethylene glycol, octamethylene glycol, neopentyl glycol, cyclohexane-dimethanol, xylylene glycol, diethylene glycol, polyoxyalkylene glycol, or hydroquinone. When copolymerization is carried out, the amount of the copolymerization components is not particularly limited so long as the effects of the invention are not impaired, but is typically not greater than 20% by mole of the acid component, or preferably not greater than 20% by mole of the glycol component.

Further, a branching component, for example, a tri- or tetra-functional acid capable of forming an ester, such as tricarballylic acid, trimesic acid, and trimellitic acid, or a tri- or tetra-functional alcohol capable of forming an ester such as glycerin, trimethylolpropane, or pentaerythritol may be copolymerized with the above-described polyester component. In this case, the amount of the branching component may be 1.0% by mole or less, preferably 0.5% by mole or less, and more preferably 0.3% by mole or less, of the total amount of the dicarboxylic acid component. Furthermore, two or more kinds of these copolymer components may be used in combination.

The method for producing the PTT used in the invention is not particularly limited. There are, for example, the methods described in JP-A-51-140992, JP-A-5-262862, and JP-A-8-311177. One example is a method comprising reacting terephthalic acid, or an ester forming derivative thereof (e.g., a lower alkyl ester such as a dimethyl ester or monomethyl ester), with trimethylene glycol, or an ester forming derivative thereof, while heating at a suitable temperature for a suitable period of time in the presence of a catalyst, and further polycondensing the resultant glycol ester of terephthalic acid at a suitable temperature for a suitable period of time in the presence of a catalyst so as to have a desired degree of polymerization.

The intrinsic viscosity [η] of the PTT used in the invention is preferably 0.60 dl/g to 1.50 dl/g, and more preferably [η] 0.68 dl/g to 1.40 dl/g, in view of mechanical characteristics, moldability and especially toughness. In view of moldability and chemical resistance, [η] is most preferably 0.75 dl/g to 1.30 dl/g.

The intrinsic viscosity [η] can be determined using an Ostwald's viscometer at 35° C., by dissolving PTT in o-chlorophenol so that the concentration of PTT/solution is 1.00 g/dl, measuring the specific viscosity ηsp, and calculating by the following formula:

$$[\eta]=0.713\times\eta sp/C+0.1086$$

C=1.00 g/dl

Further, various kinds of additive, such as heat stabilizers, antifoaming agents, isochromatic agents, flame retardants, antioxidants, ultraviolet absorbers, infrared absorbers, crystal nucleating agents, fluorescent whitening agents, and delustering agents, may be incorporated into the polytrimethylene terephthalate in accordance with the invention.

The polycarbonate resin (hereinafter sometimes abbreviated to "PC") (B) of the invention has a main chain consisting of repeating units represented the following formula (1):

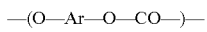 (1)

wherein Ar is a divalent aromatic residue, such as phenylene, naphthylene, biphenylene, pyridylene, or a group represented by the following formula (2):

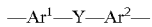 (2)

wherein each of $Ar^1$ and $Ar^2$ represents an arylene group, such as phenylene, naphthylene, biphenylene, or pyridylene; and Y is an alkylene group or a substituted alkylene group.

The polycarbonate resin (B) may also comprise, as a copolymer component, a divalent aromatic residue represented by the following formula (3):

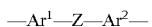 (3)

wherein $Ar^1$ and $Ar^2$ are as in formula (2); Z is simply a bond or a divalent group such as —O—, —CO—, —S—, —SO$_2$—, —CO$_2$—, —CONR$^1$—; R$^1$ is each independently a hydrogen atom, a lower alkyl group having 1 to 6 carbon atoms, a cycloalkyl group having 5 to 10 carbons, or an aryl group having 6 to 30 carbons.

Specific examples of these divalent aromatic residues are those represented by the following formula (4):

(4)

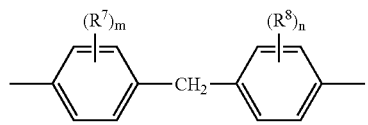

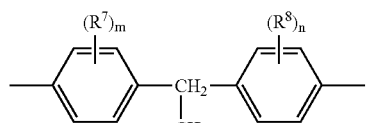

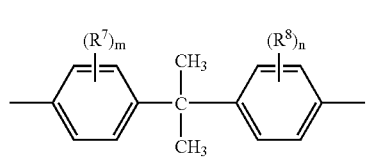

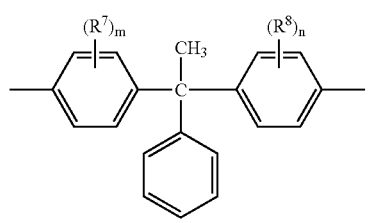

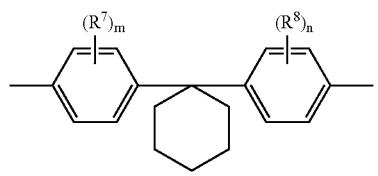

-continued

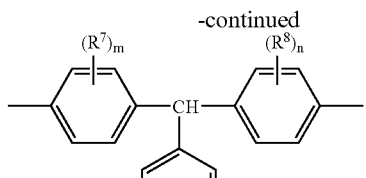

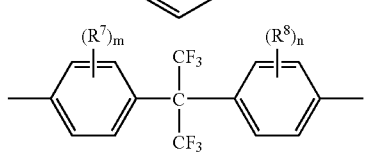

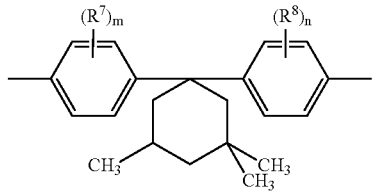

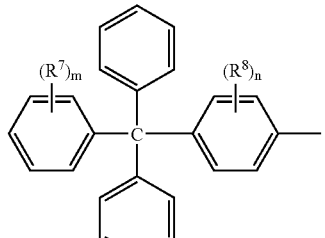

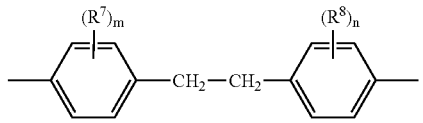

wherein $R^7$ and $R^8$ are each independently hydrogen, a halogen, an alkyl group having 1 to 10 carbons, an alkoxy group having 1 to 10 carbons, a cycloalkyl group having 5 to 10 carbons, or an aryl group having 6 to 30 carbons; m and n are an integer from 1 to 4; and when m is 2 to 4, each $R^7$ may be the same or different, and when n is 2 to 4, each $R^8$ may be the same or different.

Among these divalent aromatic residues, one preferable example is the group represented by the following formula (5).

(5)

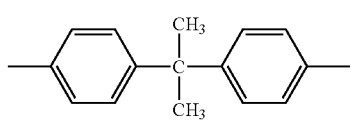

Especially preferred are polycarbonates which include 85 mol % or more (based on all of the monomer units in the polycarbonate) of repeating units having an Ar represented by the above formula (5). The polycarbonate, which can be used in the invention, may contain, as a copolymer component, a trivalent or higher aromatic residue.

The molecular structure of the polymer terminals is not particularly limited, but can be bonded with one or more kinds of terminal group selected from a phenolic hydroxyl group, an aryl carbonate group, and an alkyl carbonate group.

Among these terminal groups, preferable are a phenolic hydroxyl group, a phenyl carbonate group, a p-t-butylphenyl carbonate group, a p-cumylphenyl carbonate group and the like. The proportion of the terminal phenolic hydroxyl groups to the total number of terminal groups is not particularly limited. However, from the viewpoint of attaining better color tone and mechanical properties, it is preferred that the proportion of the terminal phenolic hydroxyl groups is 20% or more, and more preferably within the range of 20 to 80%, of the total number of terminal groups. When the proportion of the terminal phenolic hydroxyl groups is more than 80% of the total number of terminal groups, thermal stability during melting of the composition tends to slightly decrease. The proportion of the terminal phenolic groups can generally be determined by a measuring method using NMR (NMR method), a measuring method using titanium (titanium method) and a measuring method using UV or IR (UV method or IR method).

The weight average molecular weight (Mw) of the polycarbonate resin used in the invention is preferably no less than 5,000 from the perspective of impact resistance, and preferably no greater than 200,000 from the perspective of melt fluidity. More preferable is 10,000 to 60,000, further more preferable is 15,000 to 40,000, and especially preferable is 18,000 to 30,000.

Weight average molecular weight (Mw) is measured by gel permeation chromatography (GPC) under the following conditions. That is, according to the following formula, the weight average molecular weight is determined using a calibration curve obtained with respect to standard monodisperse polystyrene samples using a polystyrene gel column and tetrahydrofuran as a solvent.

$$M_{PC}=0.3591 M_{ps}^{1.0388}$$

(wherein $M_{PC}$ represents the weight average molecular weight of the polycarbonate and $M_{ps}$ represents the weight average molecular weight of the polystyrene.)

The polycarbonate resin used in the invention can be produced by a known method. For example, it can be produced by a known method, which reacts an aromatic dihydroxy compound with a carbonate precursor. Specific examples of such a method include an interfacial polymerization method (e.g., phosgene method) in which an aromatic dihydroxy compound and a carbonate precursor (e.g., phosgene) are reacted with each other in the presence of aqueous sodium hydroxide and methylene chloride as a solvent; a transesterification method (melt method) in which an aromatic dihydroxy compound and a carbonic diester (e.g., a diphenyl carbonate) are reacted with each other; a method of subjecting a crystallized carbonate prepolymer obtained by the phosgene method or by the melt method to solid state polymerization (JP-A-1-158033 (corresponding to U.S. Pat. No. 4,948,871)); and methods disclosed in JP-A-1-271426 and JP-A-3-68627 (corresponding to U.S. Pat. No. 5,204,377).

Examples of preferable polycarbonate resins include those that essentially contain no chlorine atoms and are produced by transesterification from a divalent phenol (aromatic dihydroxy compound) and a carbonic diester. In the invention, two or more different polycarbonates having different structures and/or molecular weights can be used in combination.

The crystallization enthalpy ΔHcc of component (A) obtained when the thermoplastic resin composition or the resin molded article of the invention are heated should be 0 to 15 J/g. From the perspective of impact resistance and rigidity when heated, the crystallization enthalpy ΔHcc is preferably 0 to 10 J/g, and most preferably 0 to 5 J/g.

The crystallization enthalpy ΔHcc (J/g) when heating is determined in the following manner. Using a differential scanning calorimeter (DSC), 5 mg of the resin composition or the resin molded article is held under a nitrogen atmosphere at 0° C. for 3 minutes, and then heated from 0° C. to 150° C. at a heating rate of 20° C. per minute. The ΔHcc value is calculated by dividing the crystallization peak area ΔH (J/g) which appears as an exothermic peak during the heating by the PTT content (wt %) $n_{PTT}$, which is the component (A) in the resin composition or the resin molded article.

$$\Delta Hcc = \Delta H/n_{PTT} \times 100$$

The PTT content (wt %) can be determined in the following manner. For example, 100 mg of the resin composition is dissolved in 1:1 HFIP:CDCl$_3$, and the insoluble component is either filtered off using a membrane filter (1 μm, PTFE), or removed by precipitating the insoluble component by using a centrifugal machine. The resultant solution is subjected to $^1$H-NMR measurement, whereby the PTT content can be calculated based on the integration value of the signal (4H) in the PC position "e" and the signal (4 H) in the PTT position "c". Regarding the PC position "e" and PTT position "c", see the following formulae 6 and 7.

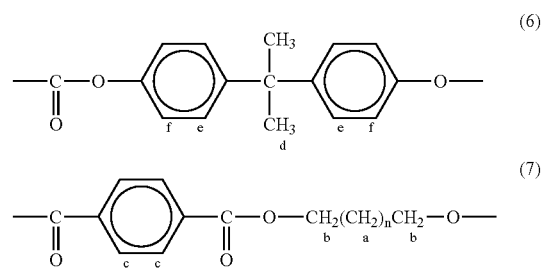

As described later, in the case where the resin composition further comprises a polyalkylene terephthalate resin other than a polytrimethylene terephthalate, the crystallization enthalpy ΔHcc (J/g) is defined as the value relating to component (A) and the other polyalkylene terephthalate resin. That is, in such cases the crystallization enthalpy ΔHcc (J/g) is the value based on the content (wt %) of the PTT and the other polyalkylene terephthalate resin, and that value must be between 0 and 15 J/g. As in the case for PTT by itself, the content (wt %) of the PTT and the other polyalkylene terephthalate resin can be calculated from $^1$H-NMR measurement based on the integration value of the signal (4H) in the PC position "e" and the signal (4H) in the PC position "c" of PTT and the other polyalkylene terephthalate resin.

From the perspective of heat resistance and rigidity when heated, the thermoplastic resin composition or resin molded article of the invention preferably have a crystallization temperature Tc of 145° C. or more when cooling. It is more preferably 160° C. or more, still more preferably 175° C. or more, and most preferably 180° C. or more. The crystallization temperature Tc when cooling is determined by using a differential scanning calorimeter as follows. 5 mg of the resin composition or the resin molded article, which have been dried in a vacuum dryer for 5 hours at 120° C., is heated under a nitrogen atmosphere from 30° C. to 270° C. at a heating rate of 20° C. per minute, is held at 270° C. for 2 minutes, and is then cooled from 270° C. to 50° C. at a cooling rate of −20° C. per minute. The crystallization peak temperature which appears as an exothermic peak during cooling is defined as the crystallization temperature Tc.

The thermoplastic resin composition of the invention consists of (A) 1 to 99 parts by weight of a polytrimethylene terephthalate whose crystallization enthalpy when heating is within the above-described range, and (B) 99 to 1 parts by weight of a polycarbonate. From the perspective of heat resistance and rigidity when heated, and impact resistance, component (A) is more preferably from 1 to 50 parts by weight while component (B) is 99 to 50 parts by weight. Further more preferably, component (A) is 10 to 50 parts by weight and component (B) from 90 to 50 parts by weight. Most preferably, component (A) is 20 to 50 parts by weight and component (B) from 80 to 50 parts by weight.

The polytrimethylene terephthalate (A) and the polycarbonate (B) desirably have similar melt viscosities at the kneading temperature. Further, it is desired that the following condition is satisfied when their melt viscosities (unit: poise) at a 100 sec$^{-1}$ shear rate are represented as $\mu(A)$ and $\mu(B)$, respectively.

$$|\mu(A)-\mu(B)| \leq 18{,}000 \text{ (poise)}$$

Such a melt viscosity difference increases compatibility between the polytrimethylene terephthalate (A) and the polycarbonate (B) and desirably allows the improved moldability and physical properties of the resin composition to be exhibited.

The method for producing the thermoplastic resin composition of the invention is not particularly limited. As a method for producing a thermoplastic resin composition which exhibits a crystallization enthalpy $\Delta$Hcc when heating of 0 to 15 J/g, and which exhibits a crystallization temperature Tc when cooling of 145° C. or more, preferable is a method comprising dry blending from 98 to 1 parts by weight of a polycarbonate (B) with 2 to 99 parts by weight of a resin composition comprising 50 to 99 parts by weight of a polytrimethylene terephthalate of component (A) and from 1 to 50 parts by weight of a polycarbonate of component (B), and then subjecting the resulting mixture to melt-kneading. Further, a preferable method for producing a resin molded article of the invention comprises a former step of dry blending from 98 to 1 parts by weight of a polycarbonate (B) with 2 to 99 parts by weight of a resin composition comprising 50 to 99 parts by weight of a polytrimethylene terephthalate of component (A) and from 1 to 50 parts by weight of a polycarbonate of component (B), and a latter step of molding the resulting mixture. The improvement in heat resistance and rigidity when heated for a resin molded article produced under the above-described production method is noticeable.

The molding and shaping step employed as the latter step in the above-described production method of a resin molded article is a conventional molding method. Examples of the method include press molding, injection molding, gas assisted injection molding, weld molding, extrusion molding, blow molding, film molding, hollow molding, multilayer molding, and foam molding. Furthermore, the shape of the resin molded article of the invention is not particularly limited.

From the perspectives of: (1) satisfying a crystallization enthalpy $\Delta$Hcc of 0 to 15 J/g when heating the composition; (2) satisfying a crystallization temperature of 145° C. or more when cooling; and having heat resistance and rigidity when heated of the molded article, it is preferred that the thermoplastic resin composition of the invention comprises 0.1 to 100 parts by weight of a polyalkylene terephthalate resin (C) as a third component other than a polytrimethylene terephthalate resin, based on 100 parts by weight of component (B). More preferable is 0.3 to 30 parts by weight of component (C) per 100 parts by weight of component (B), and most preferable is 0.5 to 10 parts by weight of component (C) per 100 parts by weight of component (B).

Examples of the polyalkylene terephthalate resin (C) which can be preferably used include polyalkylene terephthalate resins, other than polytrimethylene terephthalate, obtainable from terephthalic acid and an aliphatic diol component such as, for example, ethylene glycol, 1,4-dibutanediol, neopentyl glycol, 1,6-hexanediol, and 1,9-nonanediol. The polyalkylene terephthalate resin may be used alone or in combination of two or more. Among them, a polyethylene terephthalate resin and polybutylene terephthalate resin are preferably used, respectively, since they are especially effective in dramatically increasing the crystallization temperature when cooling of the resin composition comprising a polytrimethylene terephthalate of component (A) and a polycarbonate of component (B).

So long as the effects of the invention are not impaired, the thermoplastic resin composition and resin molded article of the invention may also be blended with an inorganic filler to improve rigidity and heat resistance. Depending on the purpose, fibrous, powdery, and plate-like inorganic fillers can be used.

Examples of fibrous inorganic filler include inorganic fibrous substances such as glass fiber, asbestos fiber, carbon fiber, silica fiber, silica-alumina fiber, zirconia fiber, boron nitride fiber, silicon nitride fiber, boron fiber, potassium titanate whisker, wollastonite, and furthermore, fiber-like substances of metals such as stainless steel, aluminum, titanium, copper, and brass. Particularly, typical examples of fibrous inorganic filler are glass fiber and carbon fiber. Organic fibrous substances with a high melting point, such as a polyamide, a fluorine-contained resin, and an acrylic resin may also be used.

Examples of powdery inorganic filler include carbon black, silicates such as silica, quartz powder, glass beads, glass powder, calcium silicate, aluminum silicate, kaolin, clay, and diatomaceous earth; metal oxides such as iron oxide, titanium oxide, zinc oxide, and alumina; metal carbonates such as calcium carbonate and magnesium carbonate; metal sulfates such as calcium sulfate and barium sulfate; silicon carbide; silicon nitride; boron nitride; and various metal powders.

Examples of plate-like inorganic filler include talc, mica, glass flake, various metal foils, and the like.

The inorganic filler of the invention is preferably at least one of the inorganic fillers selected from the group consisting of, inter alia, glass fiber, wollastonite, talc, mica, kaolin, calcium carbonate, carbon fiber (CF), and potassium titanate whisker. In particular, from the perspective of strengthening mechanical properties, the use of a glass fiber is most preferable.

These inorganic fillers may be used alone or in combination of two or more. The use of a fibrous inorganic filler, in particular a glass fiber, and a granular and/or plate-like inorganic filler together, is preferable in view of possessing mechanical strength, dimensional accuracy, and desirable electrical properties.

The average fiber length (hereinafter, also referred to as "L"), the average fiber diameter (hereinafter, also referred to as "d") and the aspect ratio (hereinafter, also referred to as "L/d") of the fibrous inorganic filler used in the invention are not specifically limited. However, for a glass fiber, from the perspective of exhibiting high mechanical properties, most preferable is an average fiber length (L) of 50 to 10,000 μm, an average fiber diameter (d) of 5 to 30 μm, and an aspect ratio (L/d) of 10 to 1,000. Further, for carbon fiber, one having an average fiber length (L) of 100 to 750 μm, an average fiber diameter (d) of 3 to 30 μm, and an aspect ratio (L/d) of 10 to 100 is preferably used. Furthermore, for wollastonite, one having an average fiber diameter of 3 to 30 μm, an average fiber length of 10 to 500 μm, and an aspect ratio (L/d) of 3 to 100 is preferably used. For each of talc, mica, kaolin, calcium carbonate, and potassium titanate whisker, one having an average particle size of 0.1 to 100 μm is preferably used.

The amount of inorganic filler added to the resin composition is preferably from 0 to 150 parts by weight per 100 parts by weight of the total weight of component (A) and component (B), more preferably from 0 to 100 parts by weight, and further more preferably from 0 to 50 parts by weight. If the inorganic filler (C) is greater than 150 parts by weight, the gloss of the molded article surface decreases.

These inorganic fillers are preferably used, in particular, after being subjected to a surface treatment. The surface treatment is performed using a known coupling agent or a film-forming agent. Examples of preferably used coupling agents include silane coupling agents and titanium coupling agents. These compounds may be subjected to a surface treatment or a bundle treatment in advance, or alternatively may be added simultaneously with the material preparation.

Examples of silane coupling agent include triethoxysilane, vinyltris(β-methoxy-ethoxy)silane, γ-methacryloxypropyltrimethoxysilane, γ-glycidoxypropyltrimethoxysilane, β-(1,1-epoxycyclohexyl)ethyltrimethoxysilane, N-α-(aminoethyl) -α-aminopropylmethyldimethoxysilane, γ-aminopropyltriethoxysilane, N-phenyl-β-aminopropyltrimethoxysilane, γ-mercaptopropyltrimethoxysilane, γ-chloropropyltrimethoxysilane, γ-aminopropyltrimethoxysilane, γ-aminopropyl-tris (2-methoxy-ethoxy)silane, N-methyl-α-aminopropyltrimethoxysilane, N-vinylbenzyl-α-aminopropyltriethoxysilane, triaminopropyltrimethoxysilane, 3-ureidopropyltrimethoxysilane, 3-4,5-dihydroimidazolpropyltriethoxysilane, hexamethyldisilazane, N,O-(bistrimethylsilyl)amide, and N,N-bis(trimethylsilyl)urea.

Among them, aminosilanes such as γ-aminopropyltrimethoxysilane and N-α-(aminoethyl)-α-aminopropyltrimethoxysilane, and epoxysilanes such as γ-glycidoxypropyltrimethoxysilane and β-(1,1-epoxycyclohexyl)ethyltrimethoxysilane are preferably used.

Examples of titanium coupling agent include isopropyltriisostearoyl titanate, isopropyltridodecylbenzenesulfonyl titanate, isopropyltris(dioctylpyrophosphate) titanate, tetraisopropylbis(dioctylphosphite) titanate, tetraoctylbis(ditridecylphosphite) titanate, tetra(1,1-diallyloxymethyl-1-butyl) bis(ditridecyl)phosphite titanate, bis(dioctylpyrophosphate) oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyl tri(dioctylphosphate) titanate, isopropyltricumylphenyl titanate, isopropyl-tri(N-amidoethyl, aminoethyl) titanate, dicumylphenyloxyacetate titanate, and diisostearoylethylene titanate.

Examples of film-forming agent include polymers such as urethane polymers; acrylic acid polymers; copolymers of maleic anhydride and an unsaturated monomer such as ethylene, styrene, α-methylstyrene, butadiene, isoprene, chloroprene, 2,3-dichlorobutadiene, 1,3-pentadiene, and cyclooctadiene; epoxy polymers; polyester polymers; vinyl acetate polymers; and polyether polymers. Among them, epoxy polymers, urethane polymers, acrylic acid polymers, butadiene-maleic anhydride copolymers, ethylene-maleic anhydride copolymers, styrene-maleic anhydride copolymers, and mixtures thereof can be preferably used.

In addition, an impact resistance improver can also be added to the thermoplastic resin composition and resin molded article of the invention for the purpose of improving the impact characteristics.

Examples of impact resistance improver include core/shell polymers in which one or more shells are grafted onto a rubber-like core. Examples of rubber component which can act as the core include butadiene rubber, butadiene-acrylic composite rubber, acrylic rubber, acrylic-silicon composite rubber, isoprene rubber, styrene-butadiene rubber, chloroprene rubber, styrene-propylene rubber, nitrile rubber, ethylene-acrylic rubber, silicon rubber, epichlorohydrin rubber, fluorine rubber, and compounds having a structure in which hydrogen is added onto an unsaturated bond portion of these components. Examples of the shell component include vinyl aromatic compounds, vinyl cyanide, acrylate esters, (meth) acrylic acid, and copolymerizable vinyl compounds thereof. Examples of vinyl aromatic compound include styrene, α-methylstyrene, p-methylstyrene, alkoxystyrene, a halogenated styrene, and the like. Examples of an acrylate ester include methylacrylate, ethylacrylate, butylacrylate, cyclohexylacrylate, octylmethacrylate, and the like. In addition, the core and/or shell preferably contain a polyfunctional compound which can function as a crosslinking agent and/or a grafting agent.

Copolymers which contain an olefinic compound, such as olefin acrylate or olefin-diene terpolymer, can also be used as the impact resistance improver. Examples of olefin acrylate copolymer include an ethylene-ethylacrylate copolymer, DPD-6169 (Union Carbide Corporation). Examples of olefin-diene terpolymer include an ethylene-propylene-diene terpolymer, EPYSN 704 (Copolymer Rubber Company).

Various kinds of rubbery polymers or copolymers can also be used as the impact resistance improver. Examples thereof include polybutadiene, polyisoprene, butadiene-acrylic composite rubber, acrylic rubber, acrylic-silicon composite rubber, and the like.

In addition, styrene-containing polymers can be preferably used as the impact resistance improver. Examples thereof include acrylonitrile-butadiene-styrene (ABS), styrene-acrylonitrile (AS), acrylonitrile-butadiene, α-methylstyrene, styrene-butadiene, styrene-butadiene-styrene (SBS), styrene-ethylene-butylene-styrene, methacrylate-butadiene-styrene (MBS), and other impact-resistant styrene-containing polymers.

Examples of such other impact resistance improvers include various kinds of elastomeric substances, such as organic silicone rubbers, elastomeric fluorohydrocarbons, polyester elastomers, polyurethane elastomers, polyetheramide elastomers, random block polysiloxane-polycarbonates, random block polysiloxane-polycarbonate copolymers, and the like.

By further blending a moldability improver into the resin composition or resin molded article of the invention, a resin composition or resin molded article which solves the object of the invention more suitably can be obtained. Examples of the moldability improver include phosphate esters, phosphite esters, higher fatty acids, metal salts of higher fatty acids, esters of higher fatty acids, higher fatty acid amide compounds, polyalkylene glycols or terminal-modified derivatives thereof, low molecular weight polyethylenes or oxidized low molecular weight polyethylenes, substituted benzylidenesorbitols, polysiloxanes, and caprolactones. Particularly preferable moldability improvers are (x) higher fatty acids, (y) metal salts of higher fatty acids, and (z) higher fatty acid esters. These moldability improvers will now be explained in more detail.

(x) Higher Fatty Acid

As the higher fatty acid, a saturated higher fatty acid, an unsaturated higher fatty acid and a mixture thereof are preferably used.

(x-1) Saturated Higher Fatty Acid

Examples of the saturated higher fatty acid include capric acid, uradecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, and a mixture thereof.

(x-2) Unsaturated Higher Fatty Acid

As the unsaturated higher fatty acid, an unsaturated fatty acid having 6 to 22 carbons is preferably used. Among them, more preferred are, for example, undecylenic acid, oleic acid, elaidic acid, cetoleic acid, erucic acid, brassidic acid, sorbic acid, linoleic acid, linolenic acid, arachidonic acid, stearolic acid, 2-hexadecenoic acid, 7-hexadecenoic acid, 9-hexadecenoic acid, gadoleic acid, gadoelaidic acid, 11-eicosenoic acid, and a mixture thereof.

(y) Metal Salt of Higher Fatty Acid

As the higher fatty acid metal salt, a saturated higher fatty acid metal salt, an unsaturated higher fatty acid metal salt, or a mixture thereof is preferably used.

(y-1) Saturated Higher Fatty Acid Metal Salt

The saturated higher fatty acid metal salt is represented by the following formula,

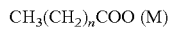

$CH_3(CH_2)_n COO\ (M)$

Here, n is an integer of 8 to 30, and group 1A, 2A and 3A elements of the periodic table, zinc, aluminum, or the like are preferably used as the metal element M.

Among them, more preferred is a lithium, sodium, magnesium, calcium, zinc, aluminum, or other metal salt of capric acid, uradecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid, or a mixture thereof.

(y-2) Metal Salt of Unsaturated Higher Fatty Acid

As the metal salt of unsaturated higher fatty acid, preferably used is a metal salt between an unsaturated fatty acid having 6 to 22 carbons and a metal salt of an element belonging to groups 1A, 2A or 3A of the periodic table, zinc, aluminum, or the like. Among them, more preferred is a lithium, sodium, magnesium, calcium, zinc, aluminum, or other metal salt of undecylenic acid, oleic acid, elaidic acid, cetoleic acid, erucic acid, brassidic acid, sorbic acid, linoleic acid, linolenic acid, arachidonic acid, stearolic acid, 2-hexadecenoic acid, 7-hexadecenoic acid, 9-hexadecenoic acid, gadoleic acid, gadoelaidic acid, or 11-eicosenoic acid, or a mixture thereof.

(z) Higher Fatty Acid Ester

As the higher fatty acid ester used for the invention, an ester of a higher alcohol and a higher fatty acid, or an ester of a polyhydric alcohol and a higher fatty acid, or a mixture thereof is preferably used.

(z-1) Ester of Higher Alcohol and Higher Fatty Acid

As the ester of a higher alcohol and a higher fatty acid, preferred are esters of a higher alcohol having not less than 8 carbons and a higher fatty acid having not less than 8 carbons. Examples of preferred higher fatty acid esters include lauryl laurate, lauryl myristate, lauryl palmitate, lauryl stearate, lauryl behenate, lauryl lignocerate, lauryl melissate, myristyl laurate, myristyl myristate, myristyl stearate, myristyl behenate, myristyl lignocerate, myristyl melissate, palmityl laurate, palmityl myristate, palmityl stearate, palmityl behenate, palmityl lignocerate, palmityl melissate, stearyl laurate, stearyl myristate, stearyl palmitate, stearyl stearate, stearyl behenate, stearyl arachinate, stearyl lignocerate, stearyl melissate, icosyl laurate, icosyl palmitate, icosyl stearate, icosyl behenate, icosyl lignocerate, icosyl melissate, behenyl laurate, behenyl myristate, behenyl palmitate, behenyl stearate, behenyl behenate, behenyl arachinate, behenyl melissate, tetracosanyl laurate, tetracosanyl palmitate, tetracosanyl stearate, tetracosanyl behenate, tetracosanyl lignocerate, tetracosanyl cerotate, cerotinyl stearate, cerotinyl behenate, cerotinyl cerotinate, melissyl laurate, melissyl stearate, melissyl behenate, melissyl melissate, and a mixture thereof.

(z-2) Ester of Polyhydric Alcohol and Higher Fatty Acid

Examples of the polyhydric alcohol used for the partial ester of a polyhydric alcohol and a higher fatty acid preferably include glycerol, 1,2,3-butanetriol, 1,2,3-pentanetriol, erythrite, pentaerythritol, trimethylolpropane, mannitol, sorbitol, and the like. Examples of the higher fatty acid preferably used therefor include capric acid, uradecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, and the like.

The above-described ester of the polyhydric alcohol and the higher fatty acid may be any of monoesters, diesters, and tri-esters. More preferred examples include higher fatty acid mono-glycerides such as glycerol mono-laurate, glycerol mono-myristate, glycerol mono-stearate, glycerol mono-behenate, glycerol mono-lignocerate, and glycerol mono-melissate; pentaerythritol higher fatty acid mono- or di-esters such as pentaerythritol mono- or di-laurate, pentaerythritol mono- or di-laurate, pentaerythritol mono- or di-myristate, pentaerythritol mono- or di-palmitate, pentaerythritol mono- or di-stearate, pentaerythritol mono- or di-behenate, pentaerythritol mono- or di-lignocerate, and pentaerythritol mono- or di-melissate; trimethylolpropane higher fatty acid mono- or di-esters such as trimethylolpropane mono- or di-laurate, trimethylolpropane mono- or di-myristate, trimethylolpropane mono- or di-palmitate, trimethylolpropane mono- or di-stearate, trimethylolpropane mono- or di-behenate, trimethylolpropane mono- or di-lignocerate, and trimethylolpropane mono- or di-melissate.

Further examples include sorbitan higher fatty acid mono-, di-, or tri-esters such as sorbitan mono-, di-, or tri-laurate, sorbitan mono-, di-, or tri-myristate, sorbitan mono-, di-, or tri-stearate, sorbitan mono-, di-, or tri-behenate, sorbitan mono-, di-, or tri-lignocerate, and sorbitan mono-, di-, or tri-melissate; mannitol higher fatty acid mono-, di-, or tri-esters such as mannitol mono-, di-, or tri-laurate, mannitol mono-, di-, or tri-myristate, mannitol mono-, di-, or tri-palmitate, mannitol mono-, di-, or tri-stearate, mannitol mono-, di-, or tri-behenate, mannitol mono-, di-, or tri-lignocerate and mannitol mono-, di-, or tri-melissate, and a mixture thereof.

These blended amount of the (x) higher fatty acid, (y) metal salt of higher fatty acid, or (z) higher fatty acid ester is preferably from 0.001 to 5 parts by weight per 100 parts by weight of PTT in the thermoplastic resin composition of the invention. The amount of 0.01 to 3 parts by weight is more preferred. A blended amount of the moldability improver of less than 0.001 part by weight is not preferred, because the moldability fails to be improved so that the object of the invention could be accomplished. Further, a blended amount of the moldability improver exceeding 5 parts by weight is not preferred, because a silvery blister tends to appear on the surface of the molded article, whereby the mechanical properties of the molded article deteriorate.

So long as the characteristics or effects of the invention is not impaired, other resins or additives, such as antioxidants, flame retardants, plasticizers, flame retardant aids, weather (light) resistance improvers, slip agents, various colorants, and the like may be incorporated as necessary into the thermoplastic resin composition of the invention.

Since the thermoplastic resin composition of the invention is excellent in molding and shaping properties, a known molding method, such as press molding, injection molding, gas assisted injection molding, weld molding, extrusion molding, blow molding, film molding, hollow molding, multilayer molding, and foam molding, can be suitably molded and shaped.

EXAMPLES

The advantageous effects of the invention will now be described in more detail with reference to the following Examples, although the invention is in no way limited to these Examples. The used thermoplastic resins and blending agents were as follows. PTT1: Polytrimethylene terephthalate resin Polytrimethylene terephthalate of an intrinsic viscosity [η]=1.10 dl/g The intrinsic viscosity [η] was determined by dissolving (A) polytrimethylene terephthalate resin in o-chlorophenol at 35° C. so that the concentration was 1.00 g/dl, then measuring the specific viscosity η sp by means of an Ostwald's viscometer, and calculating by the following formula:

[η]=0.713×η$sp$/C+0.1086

C=1.00 g/dl

PTT2: Polytrimethylene terephthalate resin Polytrimethylene terephthalate of an intrinsic viscosity [η]=0.89 dl/g PET1: Polyethylene terephthalate resin; "NEH-2050" (manufactured by Unitika Ltd.)

PBT1: Polybutylene terephthalate resin; "Duranex 2002" (manufactured by WinTech Polymer Ltd.)

PC1: Polycarbonate resin; "Iupilon S-2000" (manufactured by Mitsubishi Engineering-Plastics Corporation)

GF1: Glass fiber; "T-187", manufactured by Nippon Electric Glass Co., Ltd. (epoxy bundle treated, fiber diameter 13 μm)

MF1: Talc; "MS-P", manufactured by Nippon Talc Co., Ltd.

MF2: Talc; "Microace L-1", manufactured by Nippon Talc Co., Ltd.

EL1: MBS; "Paraloid EXL 2602", manufactured by Kureha Corporation

S1: "IRGAFOS 168"; manufactured by Ciba Specialty Chemicals K.K.

S2: "IRGANOX 1098"; manufactured by Ciba Specialty Chemicals K.K.

Evaluation of the physical properties of the resin molded articles described in the below Examples and Comparative Examples was carried out in the following manner.

1. Production and Physical Properties of the Resin Molded Article

A resin molded article was produced using an injection molding apparatus. The apparatus was a "FN 3000" manufactured by Nissei Plastic Industrial Co., Ltd. The resin molded article was obtained under injection molding conditions of a mold temperature of 80° C., injection of 20 seconds and cooling of 20 seconds. The cylinder temperature was set to 255° C.

(1-1) Crystallization Enthalpy ΔHcc (J/g) when Heating

A 5 mg portion was cut off from an ISO dumbbell specimen (4 mm thickness) molded in accordance with the above molding conditions. Using a differential scanning calorimeter (DSC), the cut portion was held at 0° C. for 3 minutes, and then heated from 0° C. to 200° C. at a heating rate of 20° C. per minute. The ΔHcc value (J/g) was determined by dividing the crystallization peak area ΔH (J/g) which appeared as an exothermic peak during the heating by the PTT content (wt %) $n_{PTT}$ in the resin molded article. When PBT was used instead of PTT (Comparative Example 2), the ΔHcc value (J/g) was determined in the same manner, by dividing the crystallization peak area ΔH (J/g) by the PBT content (wt %) $n_{PBT}$. When a combination of PTT and PET, or a combination of PTT and PBT, was used (Examples 7 to 14), the ΔHcc value J/g was determined by dividing the crystallization peak area ΔH (J/g) by the total content of PTT and PET (wt %) $n_{PTT+PET}$ or the total content of PTT and PBT (wt %) $n_{PTT+PBT}$. That is, the formula for calculating the crystallization enthalpy ΔHcc (J/g) is as follows.

$$\Delta Hcc = \Delta H/n \times 100 (n=n_{PTT}, n_{PBT}, n_{PTT+PET}, n_{PTT+PBT})$$

The content of PTT (and/or PET, PBT) (wt %) was determined by dissolving 100 mg of the above specimen in 1:1 HFIP:CDCl$_3$, filtering off the insoluble component with a membrane filter (1 μm, PTFE), subjecting the remaining solution to $^1$H-NMR measurement, and calculating the content of PTT (and/or PET, PBT) from the integration value of the signal (4H) in the PC position "e" and the signal (4H) in the PTT (PBT or PET) position "c".

The insoluble component which had been removed by filtering was vacuum dried, and its weight was then measured and used for determining the content of PTT (PBT, PET).

(1-2) Crystallization Temperature Tc (° C.) when Cooling

An ISO dumbbell specimen (4 mm thickness) molded in accordance with the above molding conditions was cut into a piece having 1 mm sides, and this piece was dried at 120° C. for 5 hours in a vacuum dryer. Using a differential scanning calorimeter, the 5 mg of this molded article was heated under a nitrogen atmosphere from 30° C. to 270° C. at a heating rate of 20° C. per minute, and then held at 270° C. for 2 minutes. The molded article was then cooled from 270° C. to 50° C. at a cooling rate of −20° C. per minute. The crystallization temperature Tc was determined from the crystallization peak temperature that appeared during the above cooling step.

(1-3) Tensile Strength (MPa)

Measurement was conducted in accordance with ISO 527-1.

(1-4) Flexural Modulus (GPa) (23° C., 70° C.)

An ISO strip specimen (4 mm thickness) was held for 1 hour at a temperature of 23° C. or 70° C., and then measured in accordance with ISO 178.

(1-5) Notched Charpy Impact Strength (KJ/m$^2$)

Measurement was conducted in accordance with ISO 179.

(1-6) Deflection Temperature Under Load (° C.)

Measurement was conducted in accordance with ISO 75-1. The load was set at 0.46 MPa.

(Blend)

PTT2, PC1, PBT1, GF1, MF1, EL1, S1 and S2 were dry-blended at a blending ratio shown in the following Table 1, and the dry-blended product was melt-kneaded using a twin screw extruder (TEM58, manufactured by Toshiba Machine Co., Ltd.). The extrusion was carried out at a screw rotation speed of 300 rpm, a cylinder temperature of 280° C. (the polymer temperature in the nozzle tip vicinity was 290° C.), an extrusion rate of 150 Kg/hr (retention time of 1 minute) and under a reduced pressure of 0.04 MPa. The polymer was discharged in strand form from the nozzle tip, and then cooled with water and cut into pellets. These pellets were made into Blends 1 to 6, respectively.

|  | Blend composition | | | | | |
|---|---|---|---|---|---|---|
| Component | Blend 1 | Blend 2 | Blend 3 | Blend 4 | Blend 5 | Blend 6 |
| PTT2 (wt %) | 60 | 70 | 56 | 56 | 63 | 69 |
| PBT1 (wt %) |  |  |  |  |  | 1 |
| PC1 (wt %) | 39.4 | 29.4 | 23.4 | 23.4 | 26.4 | 30 |
| GF1 (wt %) |  |  | 20 |  |  |  |
| MF1 (wt %) |  |  |  | 20 |  |  |
| EL1 (wt %) |  |  |  |  | 10 |  |
| S1 (wt %) | 0.2 | 0.2 | 0.2 | 0.2 | 0.2 | 0.2 |
| S2 (wt %) | 0.2 | 0.2 | 0.2 | 0.2 | 0.2 | 0.2 |

Examples 1 to 6

Blends 1 to 6 and PC1 were dried using a dehumidifying dryer at 120° C. for 5 hours, and then subjected to dry blending in the blending proportions shown in the following Table 2. Specimens were then prepared according to the injection molding method described above, and the measurement and analysis of physical properties were conducted using the predetermined methods.

Examples 7 to 14 and Comparative Examples 1 and 2

PTT1, PTT2, PET1, PBT1, PC1, GF1, MF1, MF2, EL1, S1 and S2 were dry-blended at a blending ratio shown in the following Table 2 and then the dry-blended product was melt-kneaded using a twin screw extruder (TEM58, manufactured by Toshiba Machine Co. Ltd.). The extrusion was carried out at a screw rotation speed of 300 rpm, a cylinder temperature of 280° C. (the polymer temperature in the nozzle tip vicinity was 300° C.), an extrusion rate of 150 Kg/hr (retention time of 1 minute) and under a reduced pressure of 0.04 MPa. The polymer was discharged in strand form from the nozzle tip, and then cooled with water and cut into pellets. These pellets were dried using a dehumidifying dryer at 120° C. for 5 hours, and then prepared into specimens according to the injection molding method described above. The measurement and analysis of physical properties were conducted using the predetermined methods.

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Component |  |  |  |  |  |  |  |  |  |  |
| PTT1 (wt %) |  |  |  |  |  |  | 29.7 |  | 27 | 29.7 |
| PTT2 (wt %) |  |  |  |  |  |  |  | 29.7 |  |  |
| Blend 1 (wt %) | 50 |  |  |  |  |  |  |  |  |  |
| Blend 2 (wt %) |  | 43 |  |  |  |  |  |  |  |  |
| Blend 3 (wt %) |  |  | 48 |  |  |  |  |  |  |  |
| Blend 4 (wt %) |  |  |  | 48 |  |  |  |  |  |  |
| Blend 5 (wt %) |  |  |  |  | 46 |  |  |  |  |  |
| Blend 6 (wt %) |  |  |  |  |  | 43 |  |  |  |  |
| PC1 (wt %) | 50 | 57 | 52 | 52 | 54 | 57 | 70 | 70 | 70 | 70 |
| PBT1 (wt %) |  |  |  |  |  |  | 0.3 | 0.3 | 3 |  |
| PET1 (wt %) |  |  |  |  |  |  |  |  |  | 0.3 |
| GF1 (wt %) |  |  |  |  |  |  |  |  |  |  |
| MF1 (wt %) |  |  |  |  |  |  |  |  |  |  |
| MF2 (wt %) |  |  |  |  |  |  |  |  |  |  |
| EL1 (wt %) |  |  |  |  |  |  |  |  |  |  |
| S1 (wt %) |  |  |  |  |  |  | 0.1 | 0.1 | 0.1 | 0.1 |
| S2 (wt %) |  |  |  |  |  |  | 0.1 | 0.1 | 0.1 | 0.1 |
| Physical properties |  |  |  |  |  |  |  |  |  |  |
| ΔHcc (J/g) | 4.1 | 3.8 | 3.8 | 3.5 | 3.5 | 0.5 | 1.2 | 0.9 | 0.6 | 0.4 |
| Tc (° C.) | 189 | 191 | 191 | 192 | 188 | 190 | 182 | 183 | 184 | 194 |
| Tensile strength (MPa) | 64 | 64 | 84 | 69 | 62 | 65 | 64 | 64 | 64 | 66 |
| Flexural 23° C. (GPa) | 2.55 | 2.55 | 4.08 | 3.45 | 2.47 | 2.57 | 2.57 | 2.56 | 2.55 | 2.58 |
| modulus 70° C. (Gpa) | 1.81 | 1.83 | 3.31 | 2.41 | 1.76 | 1.85 | 1.83 | 1.84 | 1.82 | 1.84 |
| Charpy impact strength (kJ/m$^2$) | 10.5 | 10.4 | 12.2 | 8.1 | 18.1 | 10.8 | 10.4 | 11.2 | 11.0 | 10.3 |
| Deflection temperature under load (° C.) (0.46 MPa) | 134 | 134 | 142 | 136 | 133 | 136 | 135 | 135 | 134 | 136 |

|  | Example 11 | Example 12 | Example 13 | Example 14 | Comparative Example 1 | Comparative Example 2 |
|---|---|---|---|---|---|---|
| Component |  |  |  |  |  |  |
| PTT1 (wt %) | 26.5 | 26.5 | 26.5 | 24.5 |  |  |
| PTT2 (wt %) |  |  |  |  | 30 |  |
| Blend 1 (wt %) |  |  |  |  |  |  |
| Blend 2 (wt %) |  |  |  |  |  |  |
| Blend 3 (wt %) |  |  |  |  |  |  |
| Blend 4 (wt %) |  |  |  |  |  |  |
| Blend 5 (wt %) |  |  |  |  |  |  |
| Blend 6 (wt %) |  |  |  |  |  |  |
| PC1 (wt %) | 63 | 63 | 63 | 60 | 70 | 70 |

-continued

| | | | | | | |
|---|---|---|---|---|---|---|
| PBT1 (wt %) | 0.3 | 0.3 | 0.3 | 0.3 | | 30 |
| PET1 (wt %) | | | | | | |
| GF1 (wt %) | 10 | | | | | |
| MF1 (wt %) | | 10 | | 10 | | |
| MF2 (wt %) | | | 10 | | | |
| EL1 (wt %) | | | | 5 | | |
| S1 (wt %) | 0.1 | 0.1 | 0.1 | 0.1 | 0.1 | 0.1 |
| S2 (wt %) | 0.1 | 0.1 | 0.1 | 0.1 | 0.1 | 0.1 |
| Physical properties | | | | | | |
| ΔHcc (J/g) | 1.1 | 0.8 | 0.6 | 0.9 | 17.2 | 0 |
| Tc (° C.) | 183 | 183 | 184 | 183 | 141 | 188 |
| Tensile strength (MPa) | 85 | 69 | 70 | 62 | 64 | 63 |
| Flexural modulus 23° C. (GPa) | 4.11 | 3.43 | 3.47 | 2.88 | 2.50 | 2.44 |
| Flexural modulus 70° C. (GPa) | 3.35 | 2.39 | 2.45 | 2.02 | 1.61 | 1.69 |
| Charpy impact strength (kJ/m²) | 12.3 | 8.2 | 8.5 | 12.5 | 10.5 | 10.5 |
| Deflection temperature under load (° C.) (0.46 MPa) | 144 | 137 | 136 | 134 | 127 | 107 |

INDUSTRIAL APPLICABILITY

According to the present invention, a thermoplastic resin composition having not only extremely excellent mechanical properties and moldability but also excellent appearance, impact resistance, heat resistance, and rigidity when heated can be provided. The present invention is expected to greatly contribute to meeting the requirements for improved high performance and high functionality demanded in various applications, such as automobile exterior parts or outer plate parts, automobile interior parts, automobile underhood parts, two-wheeled vehicle parts, parts used in home furniture, items used in office automation equipments, items used in electricals and electronics, and items used in industrial applications.

The invention claimed is:

1. A thermoplastic resin composition which comprises (A) 1 to 50 parts by weight of a polytrimethylene terephthalate, (B) 99 to 50 parts by weight of a polycarbonate, and 0.1 to 10 parts by weight of a polyalkylene terephthalate resin (C) based on 100 parts by weight of the component (B), said polyalkylene terephthalate resin excluding polytrimethylene terephthalate, and
wherein components (A) and (C) have a crystallization enthalpy ΔHcc, which is obtained when the thermoplastic resin composition is heated from 0° C. at 20° C./min, of 0 to 15 J/g, the crystallization enthalpy ΔHcc determined according to formula (II):
Crystallization peak area ΔH measured using a DSC (J/g)/(Sum of the content of component (A) (wt %) and the content of component (C) (wt %) based on the total amount of the thermoplastic resin composition)×100=ΔHcc (J/g) (II).

2. The thermoplastic resin composition according to claim 1, wherein a crystallization temperature Tc of the thermoplastic resin composition, which is obtained when the thermoplastic resin composition in a molten state at 270° C. is cooled at −20° C./min, is 145° C. or more.

3. The thermoplastic resin composition according to claim 1, wherein a crystallization temperature Tc of the thermoplastic resin composition, which is obtained when the thermoplastic resin composition in a molten state at 270° C. is cooled at −20° C./min, is 175° C. or more.

4. The thermoplastic resin composition according to claim 1, wherein the thermoplastic resin composition is produced by melt-kneading 2 to 99 parts by weight of a resin composition (D), which comprises 50 to 99 parts by weight of component (A) and 50 to 1 parts by weight of component (B), 98 to 1 parts by weight of component (B), and 0.1 to 10 parts by weight of a polyalkylene terephthalate resin (C) based on 100 parts by weight of the component (B), provided that component (D)+component (B)+component (C)=100 parts by weight.

5. The thermoplastic resin composition according to claim 1, wherein component (C) is a polyethylene terephthalate resin and/or a polybutylene terephthalate resin.

6. A method for producing the thermoplastic resin composition according to claim 1, wherein said method comprises melt-kneading 2 to 99 parts by weight of a resin composition (D), which comprises 50 to 99 parts by weight of component (A) and 50 to 1 parts by weight of component (B), 98 to 1 parts by weight of component (B), and 0.1 to 10 parts by weight of a polyalkylene terephthalate resin (C) based on 100 parts by weight of the component (B), provided that component (D)+component (B)+component (C)=100 parts by weight.

7. A resin molded article which is produced by molding the thermoplastic resin composition according to claim 1.

8. A method for molding the resin molded article according to claim 7, wherein said method comprises dry blending 2 to 99 parts by weight of a resin composition (D), which comprises 50 to 99 parts by weight of component (A) and 50 to 1 parts by weight of component (B), 98 to 1 parts by weight of component (B), and 0.1 to 10 parts by weight of a polyalkylene terephthalate resin (C) based on 100 parts by weight of the component (B), provided that component (D)+component (B)+component (C)=100 parts by weight), and subsequently molding and shaping the dry-blended product.

9. The resin molded article according to claim 7, wherein a crystallization temperature Tc of the resin molded article, which is obtained when resin molded article in a molten state at 270° C. is cooled at −20° C./min, is 145° C. or more.

10. The resin molded article according to claim 7, wherein a crystallization temperature Tc of the resin molded article, which is obtained when the resin molded article in a molten state at 270° C. is cooled at −20° C./min, is 175° C. or more.

* * * * *